(12) United States Patent
Waschura et al.

(10) Patent No.: US 10,972,638 B1
(45) Date of Patent: Apr. 6, 2021

(54) GLARE CORRECTION IN SENSORS

(71) Applicant: Zoox, Inc., Foster City, CA (US)

(72) Inventors: Harrison Thomas Waschura, Los Altos Hills, CA (US); Joseph Patrick Warga, San Francisco, CA (US); Subasingha Shaminda Subasingha, Weston, FL (US); Robert Nicholas Moor, San Mateo, CA (US); Ryan McMichael, Mountain View, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 16/550,102

(22) Filed: Aug. 23, 2019

(51) Int. Cl.

| | |
|---|---|
| *H04N 13/271* | (2018.01) |
| *H04N 5/217* | (2011.01) |
| *H04N 13/128* | (2018.01) |
| *G06T 7/73* | (2017.01) |
| *G01S 7/48* | (2006.01) |
| *G01S 17/931* | (2020.01) |
| *G01S 7/487* | (2006.01) |
| *H04N 13/00* | (2018.01) |

(52) U.S. Cl.
CPC .......... *H04N 5/217* (2013.01); *G01S 7/4808* (2013.01); *G01S 17/931* (2020.01); *G06T 7/73* (2017.01); *H04N 13/128* (2018.05); *G01S 7/4873* (2013.01); *G06T 2207/10028* (2013.01); *G06T 2207/30241* (2013.01); *G06T 2207/30252* (2013.01); *H04N 2013/0081* (2013.01)

(58) Field of Classification Search
CPC ........ H04N 5/217; H04N 13/128; G06T 7/73; G01S 17/931; G01S 7/4808
See application file for complete search history.

(56) References Cited

U.S. PATENT DOCUMENTS

| | | | |
|---|---|---|---|
| 2002/0113882 A1* | 8/2002 | Pollard | H04N 1/2116 348/239 |
| 2003/0169213 A1* | 9/2003 | Spero | G02B 27/0093 345/7 |
| 2013/0162518 A1* | 6/2013 | Athavale | G06F 3/0304 345/156 |
| 2016/0267305 A1* | 9/2016 | Lei | G06K 7/10851 |
| 2018/0167547 A1* | 6/2018 | Casey | G06T 7/246 |
| 2019/0376809 A1* | 12/2019 | Hanniel | G06F 16/29 |
| 2019/0384232 A1* | 12/2019 | Casey | G05B 11/01 |
| 2020/0116836 A1* | 4/2020 | Pacala | G01S 17/86 |

* cited by examiner

*Primary Examiner* — Jonathan R Messmore
(74) *Attorney, Agent, or Firm* — Lee & Hayes, P.C.

(57) ABSTRACT

Sensors, including time-of-flight sensors, may be used to detect objects in an environment. In an example, a vehicle may include a time-of-flight sensor that images objects around the vehicle, e.g., so the vehicle can navigate relative to the objects. Sensor data generated by the time-of-flight sensor can be impacted by glare. In some examples, corrected data is generated by quantifying glare. A glare region including pixels that are not associated with an object in a range of the time-of-flight sensor may provide glare intensity and glare depth values used to quantify the glare. The glare intensity and glare depth may be used to correct measured data.

20 Claims, 5 Drawing Sheets

GLARE CORRECTION IN SENSORS

BACKGROUND

Sensors, such as time-of-flight sensors, may be unreliable in certain environments, including environments in which objects have high reflectivity. For instance, highly reflective objects can cause glare, and glare can result in inaccurate measurements of both intensity and distance. Such inaccuracies can create difficulties in appropriately identifying and/or characterizing the highly reflective object, as well as other objects in the data. When such a sensor is intended for use on an autonomous vehicle, glare can be a hindrance to identifying and/or characterizing potential obstacles to travel, thereby reducing safety.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
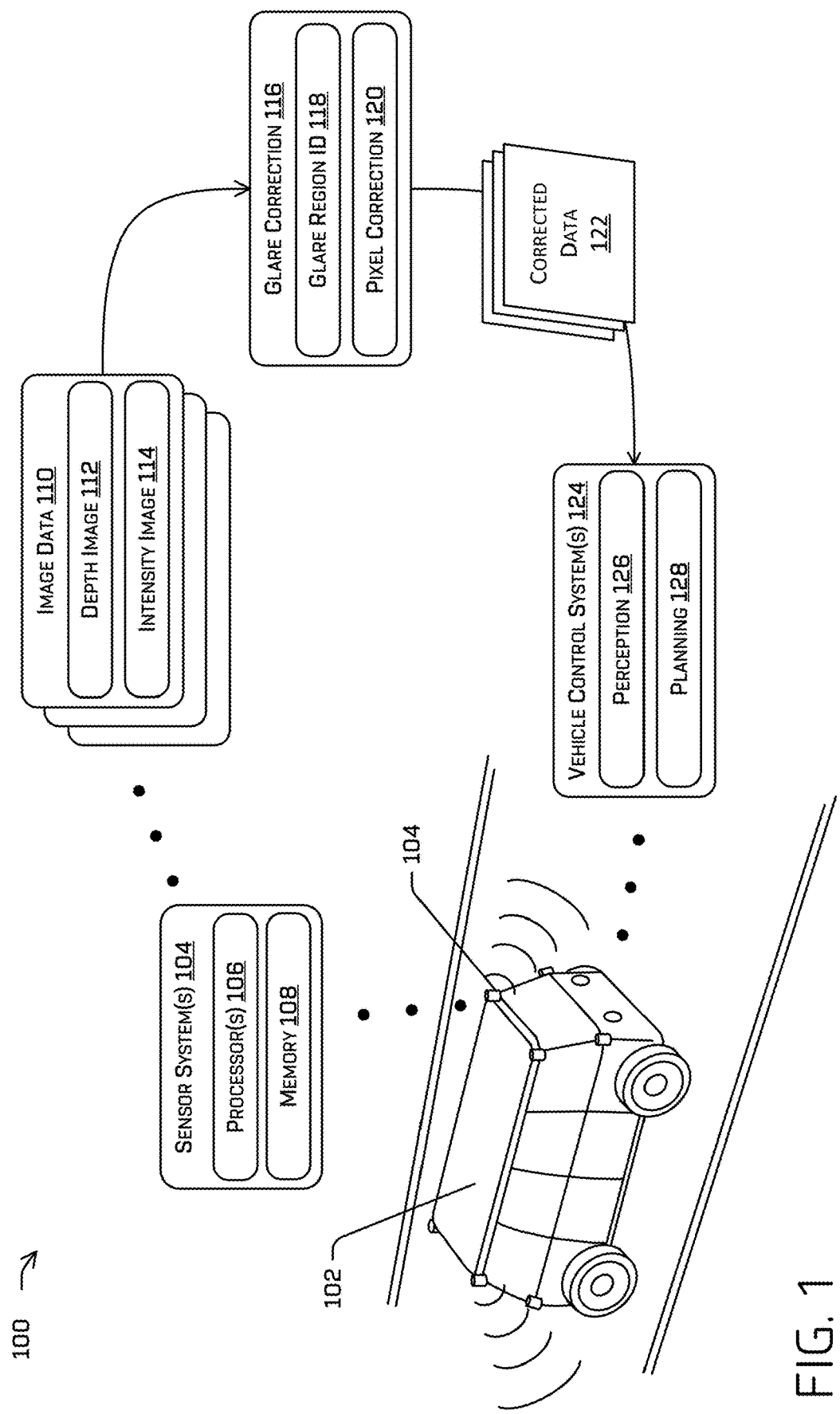
FIG. 1 is a schematic illustration showing an example vehicle, such as an autonomous vehicle, and example components and functionality of a sensor system associated with the vehicle, as described herein.

This disclosure describes methods, apparatuses, and systems for generating sensor data that can be used to identify objects in an environment and to control a vehicle relative to those identified objects. For example, an autonomous vehicle can include a plurality of sensors to capture sensor data corresponding to an environment of the vehicle. The sensor data can include data associated with the environment, which, in some instances, can include multiple objects (e.g., pedestrians, vehicles, bicyclists, etc.). Oftentimes, different sensor modalities are used for redundancy purposes and/or because of inherent shortcomings in the sensors. For example, time-of-flight sensors, relative to other sensor types, may generate sensor data more quickly and/or may be more reliable at shorter ranges. As a result of these characteristics, some vehicle implementations may use time-of-flight sensors in safety critical applications, e.g., to recognize objects in close proximity to the vehicle and/or to avoid imminent collisions. However, in some instances intensity and distance information generated by time-of-flight sensors may be unreliable due to one or more of oversaturation, glare caused by highly reflective objects, pixel noise from stray light, under exposure, ambiguous returns, or the like. Techniques described herein can be used to improve sensor data, including time-of-flight sensor returns. For example, in implementations described herein, glare correction techniques may be used to provide improved intensity data and/or depth data that excludes errors caused by glare. Such techniques may, in some instances, result in a better understanding of the environment of the vehicle, thereby leading to safer navigation and/or more confident controlling of the vehicle.

As discussed herein, sensor data can be captured by one or more sensors, which can include time-of-flight sensors, RADAR sensors, LiDAR sensors, SONAR sensors, image sensors, microphones, or any combination thereof. The sensor can include an emitter to emit a signal and a sensor to sense a return signal from the environment. In the context of a time-of-flight sensor, the captured sensor data can be represented, for example, in a raw (e.g., a quadrature) format. In some instances, the sensor data in the quadrature format can include one or more pixels where each pixel can be represented as a numerical value (e.g., 12 bits with a value range of $2^{-11}$ to $(2^{11}-1)$). After determining the sensor data in the quadrature format, a sensor computing device (e.g., an FPGA, SoC, ASIC, CPU, etc.) can determine the sensor data in an intensity and depth format. In some instances, the intensity and depth format can include an intensity image and a depth image having, respectively, per-pixel intensity and depth values. In some implementations, the sensor computing device can also, using the sensor data in the intensity and depth format, perform an unprojection operation to determine the sensor data in an unprojected format to project each pixel in the sensor data into a multi-dimensional space (e.g., 3D-space using an x-position, a y-position, and a z-position).

In implementations described herein, a sensor, a sensor computing device, and/or another computing system in communication with the sensor can generate improved or corrected sensor data that removes the effects of glare from measured data. As described above, glare may be caused when emitted, e.g., illumination, light reflects off highly reflective objects. Image data that includes the effects of glare may be inaccurate, and correcting for these inaccuracies can provide improved safety outcomes, for example.

In some examples, techniques described herein for correcting for glare can include quantifying the glare. The effects of glare may be substantially uniform over portions of image data, and some implementations may quantify this uniform effect as a glare depth and/or a glare intensity across the image and/or portions of the image. In examples, a measured intensity of a pixel, e.g., in an intensity image, can be the sum of the actual intensity of the pixel and the glare intensity. Similarly, measured depths can be impacted by the glare depth, as described herein. In other examples, glare may be quantified on a per-pixel basis, e.g., based on glare distribution functions for the sensor.

Some implementations may quantify glare by identifying a glare region and determining glare depth and/or glare intensity from pixels in the glare region. In some instances, the glare region can correspond to a region in the image that corresponds to portions of the environment that do not include objects in a range of the sensor. For instance, a time-of-flight sensor may have a relatively shorter range in which it can reliably sense objects, e.g., compared to LiDAR, radar, and/or other ranging-type sensors. When an object is not present in the field of view (and range) of the sensor, the sensor may determine an ambiguous depth and a very low intensity in the absence of glare. However, glare can cause such regions to have a higher intensity and a measured depth. For example, the measured depth can generally correspond to a depth of the reflective surface causing the glare. By identifying pixels in areas that are known to be free of objects, techniques described herein can determine the glare depth and the glare intensity as the measured depth and measured glare, respectively, at those pixels. Thus, in at least some examples, the glare region may be one or more portions of the image data, e.g., a subset of pixels, that are not associated with a sensed object.

Techniques described herein can determine the glare region according to one or more different techniques. For instance, the glare region can be determined as "dark" pixels, e.g., pixels having a very low intensity. Such pixels may be identified in an exposure generated using a low illumination intensity. The glare region can also or alternatively be determined using depth information. As noted above, pixels that are not associated with sensed objects may all have a uniform depth, e.g., corresponding to the glare depth. Thus, techniques herein can consult histograms to determine a depth or depths that occur most frequently in the depth information, e.g., a depth image. Other techniques can include determining areas that have low depth variance. Still further techniques can compare depth images, e.g., captured at different times, to determine pixels for which depth has not changed or has changed less than a (low) threshold depth. Such pixels may correspond to the background, and thus may be identified as the glare region. Other techniques for generating a glare region also are described herein.

In some implementations of this disclosure, the glare region can be used to determine the glare depth and/or the glare intensity. As described above, the measured depth at pixels in the glare region may correspond to (e.g., be equal to) a depth attributable to glare, e.g., the glare depth. Similarly, the measured intensity at pixels in the glare region may correspond to (e.g., be equal to) an intensity attributable to glare, e.g., the glare intensity. These measured depth and intensity values may be determined from a depth image and an intensity image, respectively. In some instances, the glare depth and/or the glare intensity may be used to generate a glare mask, which an associate the glare depth and/or the glare intensity with individual pixels, e.g., in an image space.

Techniques described herein can also generate corrected data using the measured values and the glare mask. For instance, an actual intensity (e.g., an intensity measured in the absence of glare) for a pixel may be the difference between the measured intensity and the glare intensity. Similarly, the actual distance of the object can be determined using the glare depth. In some examples, the corrected data can include a corrected depth image and/or a corrected intensity image, which generally correspond to a measured depth image and/or a measured intensity image, respectively. As noted above, the corrected data can include more accurate data than the measured data, because the effects of glare have been removed.

In some examples, the corrected image data, free of the effects of the glare, may be provided to, received by, or otherwise accessed by a computing device of an autonomous vehicle. For instance, the autonomous vehicle may use the corrected image data to determine one or more trajectories for proceeding relative to objects determined from the corrected data. In some instances, corrected depth and/or corrected intensity information generated according to techniques described herein may be combined, or fused, with data from other sensor modalities to determine the one or more trajectories.

Techniques described herein may be directed to leveraging sensor and perception data to enable a vehicle, such as an autonomous vehicle, to navigate through an environment while circumventing objects in the environment. Techniques described herein can utilize information sensed about the objects in the environment, e.g., by a time-of-flight sensor, to correct data and more accurately determine features of the objects. For example, techniques described herein may be faster and/or more robust than conventional techniques, as they may increase the reliability of depth and/or intensity information, potentially alleviating the need for extensive post-processing, duplicate sensors, and/or additional sensor modalities. That is, techniques described herein provide a technological improvement over existing sensing, object detection, classification, prediction and/or navigation technologies. In addition to improving the accuracy with which sensor data can be used to determine objects and correctly characterize motion of those objects, techniques described herein can provide a smoother ride and improve safety outcomes by, for example, more accurately providing safe passage to an intended destination.

While this disclosure uses an autonomous vehicle in examples, techniques described herein are not limited application in autonomous vehicles. For example, any system in which inconsistent sensor data exists, e.g., caused at least in part by glare, may benefit from the techniques described. By way of non-limiting example, techniques described herein may be used on aircrafts, e.g., to correct intensities and/or depths associated with objects in an airspace or on the ground. Moreover, non-autonomous vehicles could also benefit from techniques described herein, e.g., for collision detection and/or avoidance systems. The techniques described herein may also be applicable to non-vehicle applications. By way of non-limiting example, techniques and implementations described herein can be implemented in any system, including non-vehicular systems, that generates, uses, and/or outputs sensor data, such as time-of-flight sensor data.

FIGS. 1-5 provide additional details associated with the techniques described herein.

FIG. 1 illustrates an example environment 100 through which an example vehicle 102 is traveling. The example vehicle 102 can be a driverless vehicle, such as an autonomous vehicle configured to operate according to a Level 5 classification issued by the U.S. National Highway Traffic Safety Administration. The Level 5 classification describes a vehicle capable of performing all safety-critical functions for an entire trip, with the driver (or occupant) not being expected to control the vehicle at any time. In such examples, because the vehicle 102 can be configured to control all functions from start to completion of the trip, including all parking functions, the vehicle may not include a driver and/or controls for manual driving, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 102 can be any configuration of vehicle, such as, for example, a van, a sport utility vehicle, a cross-over vehicle, a truck, a bus, an agricultural vehicle, and/or a construction vehicle. The vehicle 102 can be powered by one or more internal combustion engines, one or more electric motors, hydrogen power, any combination thereof, and/or any other suitable power source(s). Although the example vehicle 102 has four wheels, the systems and methods described herein can be incorporated into vehicles having fewer or a greater number of wheels, tires, and/or tracks. The example vehicle 102 can have four-wheel steering and can operate generally with equal performance characteristics in all directions. For instance, the vehicle 102 may be configured such that a first end of the vehicle 102 is the front end of the vehicle 102, and an opposite, second end of the vehicle 102 is the rear end when traveling in a first direction, and such that the first end becomes the rear end of the vehicle 102 and the second end of the vehicle 102 becomes the front end of the vehicle 102 when traveling in the opposite direction. Stated differently, the vehicle 102 may be a bi-directional vehicle capable of travelling forward in either of opposite directions. These example characteristics may facilitate greater maneuverability, for example, in small spaces or crowded environments, such as parking lots and/or urban areas.

A vehicle such as the example vehicle 102 can be used to travel through an environment and collect data. For example, the vehicle 102 can include one or more sensor systems 104. The sensor system(s) 104 can be, for example, one or more time-of-flight sensors, LiDAR sensors, RADAR sensors, SONAR sensors, image sensors, audio sensors, infrared sensors, location sensors, etc., or any combination thereof. Certain implementations described herein may be particularly well-suited for use with time-of-flight sensors, although other types of sensors also are contemplated. The sensor system(s) 104 may be disposed to capture sensor data associated with the environment. For example, the sensor data may be processed by a vehicle control system to identify and/or classify objects in the environment, e.g., trees, vehicles, pedestrians, buildings, road surfaces, signage, barriers, road marking, or the like and/or to navigate the vehicle 102 relative to such object(s).

As also illustrated in FIG. 1, the sensor system(s) 104 can include one or more processors 106 and memory 108 communicatively coupled to the processor(s) 106. The memory 108 can store processor-executable by the processor(s) 106 to cause the sensor system(s) 104 to perform functions that quantify glare and image data and/or correct the data to remove the impact of the glare, as detailed herein. The processor(s) 106 and/or the memory 108 may be physically integrated into the sensor system(s), e.g., as an SoC, FPGA, ASIC, or the like, or, in some implementations, the processor(s) 106 and/or the memory 108 may be available to, e.g., connected to receive signals from and/or send signals to, the sensor system(s) 104. As discussed above, the sensor system(s) 104 can determine the sensor data in various formats (e.g., a quadrature format, an intensity and depth format, and/or an unprojected format) using the processor(s) 106.

In the example of FIG. 1, the sensor system(s) 104 may include a time-of-flight sensor, which may be configured to emit a carrier (e.g., a signal) and receive, e.g., capture, a response carrier (e.g., a response signal) comprising the carrier reflected off a surface in the environment. The time-of-flight sensor may be configured to determine sensor data in a quadrature format based on the carrier and the response carrier. In some instances, the sensor can measure a phase shift between the carrier and the response carrier and/or perform numerical integration calculation to determine the sensor data in the quadrature format (e.g., determining one or more of a quadrature from the response signal). In some implementations, the sensor can also determine an intensity and depth format of the sensor data, which may also be referred to as an intensity image and a depth image, respectively. For example, using the quadrature data, the sensor system can determine depth values and intensity values for each of a plurality of pixels representing a sensed environment and generate the depth and intensity images based on such values.

As also illustrated in FIG. 1, the sensor system(s) 104 may be configured to output the sensor data, e.g., the intensity and depth information, the quadrature values, or the like, as image data 110. The image data 110 may be embodied as image frames. The image data 110 can include a stream of serially-generated (e.g., at a predetermined interval) image frames. Generally, each of the frames 110 may include the same type of data, e.g., data related to the intensity and depth for each of a plurality of pixels comprising the receiver of the sensor. As illustrated in FIG. 1, the image data 110 can include a depth image 112 and an intensity image 114 generated by the sensor system(s) 104 and representative of a portion of the environment 100. Similarly, other instances, e.g., frames, of the image data 110 can include an intensity image and/or a depth image representative of the environment 100 at the corresponding sensing time.

As noted above, objects in the environment 100 may have different reflectively, and some highly reflective objects, e.g., retroreflectors, can result in glare in the image data 100. Moreover, some less-reflective objects that are close to the sensor system(s) 104 can also result in image glare. In examples, glare may impact more than just the pixels associated with the highly reflective object. For instance, glare may impact substantially all pixels in the image data 110. Such impact may be visible in the image data 110 as ghosting or a haze. In some examples, glare can result in a relatively uniform error in both intensity and depth measurements. Glare may be read by the sensor as a depth that is generally related to the depth of the (reflective) surface causing the glare. Techniques described herein can correct for glare by quantifying the glare and adjusting measured depth and intensity based on the attributes of the glare. For example, the image data 110 corrected using the techniques described herein may better represent the environment and/ or may have a higher associated confidence.

As illustrated in FIG. 1, a glare correction system 116 may be configured to receive the image data 110 generated by the sensor system(s) 104. In more detail, the glare correction system 116 can include a glare region identification component 118 and a pixel correction component 120. For clarity, the glare correction system 116 (and its components) are illustrated separate from the sensor system(s) 104 and from one or more vehicle control system(s) 124. However, portions of the glare correction system 116 may be implemented on one or both of the sensor system(s) 104 and/or the vehicle control system(s) 124. By way of non-limiting example, the processor(s) 106 may be configured to execute actions associated with the glare region identification component 118 and/or the pixel correction component 120.

The glare region identification component 118 may be configured to identify portions of the image data, e.g., pixels in the intensity image and/or the depth image, from which attributes of the glare can be determined. In some implementations detailed further herein, the glare region(s) can include region(s) that are not associated with objects. For instance, once pixels that are associated with a background are determined, the depth image 112 can be interrogated to determine a depth value for those pixels and the intensity image 114 can be interrogated to determine an intensity value for those pixels. In examples, pixels not associated with objects, and in some instances pixels associated with background objects or space beyond an unambiguous range of the sensor system(s) 104, may have a measured depth and a measured intensity that represent a depth (a glare depth)

and an intensity (a glare intensity), respectively, of the glare. Moreover, as noted above, in some aspects, the glare depth and the glare intensity may be uniform across the images, e.g., the same for all pixels in an instance of the image data 110. Additional details of the glare region identification component 118, including processes for identifying glare regions, are described further herein, including in connection with FIG. 4

The pixel correction component 120 may be configured to determine corrected pixel values for measured pixels in the image data. For example, the pixel correction component 120 can determine an actual, e.g., corrected to compensate for glare, depth of a pixel using a measured depth of that pixel and the glare depth determined from the glare region. Similarly, the pixel correction component 120 can determine an actual, e.g., corrected to compensate for glare, intensity of a pixel using a measured intensity of that pixel and the glare intensity determined from the glare region. In more detail, in the absence of glare, a measured depth is expected to correspond to, e.g., be equal to, a depth to the measured object. However, when image data includes glare, the measured depth can be approximated as a linear combination of a depth attributable to the glare and the actual depth of the object to the sensor, weighted by the intensity of the glare and the intensity of the object, respectively, and inversely proportional to the intensity of the glare and the object (together the measured intensity). In such a model, it is assumed that a quantity represented by the product of intensity and depth for any given pixel can be broken down into a linear combination of products of intensities and depths attributable to glare and of the object itself. Equation (1) describes this combination:

$$d_{measured} = \frac{I_{glare} \times d_{glare} + I_{obj} \times d_{obj}}{I_{glare} + I_{obj}} \quad (1)$$

In Equation (1), $d_{measured}$ is the measured depth, e.g., from the depth image 112 of the image data 110, $I_{glare}$ is the intensity attributable to glare (e.g., the glare intensity), $d_{glare}$ is the depth attributable to glare (e.g., the glare depth), $I_{obj}$ is the actual intensity of the object, e.g., the intensity that would be measured in the absence of glare, and $d_{obj}$ is the actual depth of the object, e.g., the depth that would be measured by the sensor in the absence of glare. As will be appreciated from Equation (1), when glare is present, the measured depth ($d_{measured}$) is different from the actual depth of the object ($d_{obj}$). Accordingly, in the example in which glare is present in the image data 110 captured by the sensor system(s) 104 associated with the vehicle 102, glare can introduce error into determining where objects are relative to the vehicle 102. Such errors can result in unsafe operation of the vehicle 102. For instance, the difference between $d_{measured}$ and $d_{obj}$ may be the difference between colliding with the object and avoiding a collision. Accordingly, aspects of this disclosure may be used to determine $d_{obj}$ (and $I_{obj}$), which can improve functioning of the vehicle 102.

As noted above, glare can also impact intensity measurements. Equation (2) represents the total intensity of a pixel:

$$I_{measured} = I_{glare} + I_{obj} \quad (2)$$

In Equation (2), $I_{measured}$ is the measured intensity, e.g., from the intensity image 114 of the image data 110. As demonstrated by Equation (2), the measured intensity ($I_{measured}$) is the sum of the glare intensity and the actual intensity of the object. Equation (2) can be used to rewrite Equation (1) to solve for $d_{obj}$, as follows:

$$d_{obj} = \frac{d_{measured} \times I_{measured} - I_{glare} \times d_{glare}}{I_{measured} - I_{glare}} \quad (3)$$

In Equation (3), $d_{measured}$ and $I_{measured}$ are known from the image data 110, e.g., from the depth image 112 and the intensity image 114, respectively. $I_{glare}$ and $d_{glare}$ are unknown from the image data 110, but can be determined from the glare region identified by the glare region identification component 118. For example, and as described further herein, $d_{glare}$ may be the depth associated with one or more of the pixels in the glare region (e.g., the measured depth of these pixels). Similarly, $I_{glare}$ may be the intensity associated with one or more of the pixels in the glare region (e.g., the measured intensity of those pixels). Thus, by quantifying $d_{glare}$ and $I_{glare}$ from data about the glare region, the pixel correction component 120 can solve Equation (3) to determine the true depth of each pixel (e.g., $d_{obj}$) associated with a sensed object. Moreover, the true intensity of the object (e.g., $I_{obj}$) can be determined using Equation (2), e.g., by subtracting $I_{glare}$ from $I_{measured}$.

As also illustrated in FIG. 1, the glare correction system 116 can output corrected data 122, which can include the values $d_{obj}$ and/or $I_{obj}$ for some or all of the pixels associated with the image data 110. In some instances, the corrected data 122 can include a corrected intensity image and/or a corrected depth image, generally corresponding to the depth image 112 and the intensity image 114, respectively, but with the impact of glare removed. In some examples, the corrected data 122 may have a pixel-to-pixel correspondence with the image data, although in other implementations the corrected data can include information for fewer pixels. By way of non-limiting example, the corrected data 122 can include only those pixels associated with an object and/or pixels outside the glare region identified by the glare region identification component 118.

As also illustrated in FIG. 1, the corrected data may be transmitted to the vehicle control system(s) 124, e.g., for use in controlling the vehicle 102. By way of non-limiting example, the vehicle control system(s) can include a perception system 126 and a planning system 128. In examples, the perception system 126 may receive the corrected data and perform one or more of object detection, segmentation, and/or classification to determine objects in the data. The planning system 128 may determine a trajectory or route for the vehicle 102, e.g., relative to objects perceived by the perception system 126 from the corrected data 122. As described herein, providing the vehicle control system(s) 124 with the corrected data 122 can improve safety outcomes, e.g., relative to providing the vehicle control system(s) 124 with the image data 110 impacted by glare.

Figure 2:
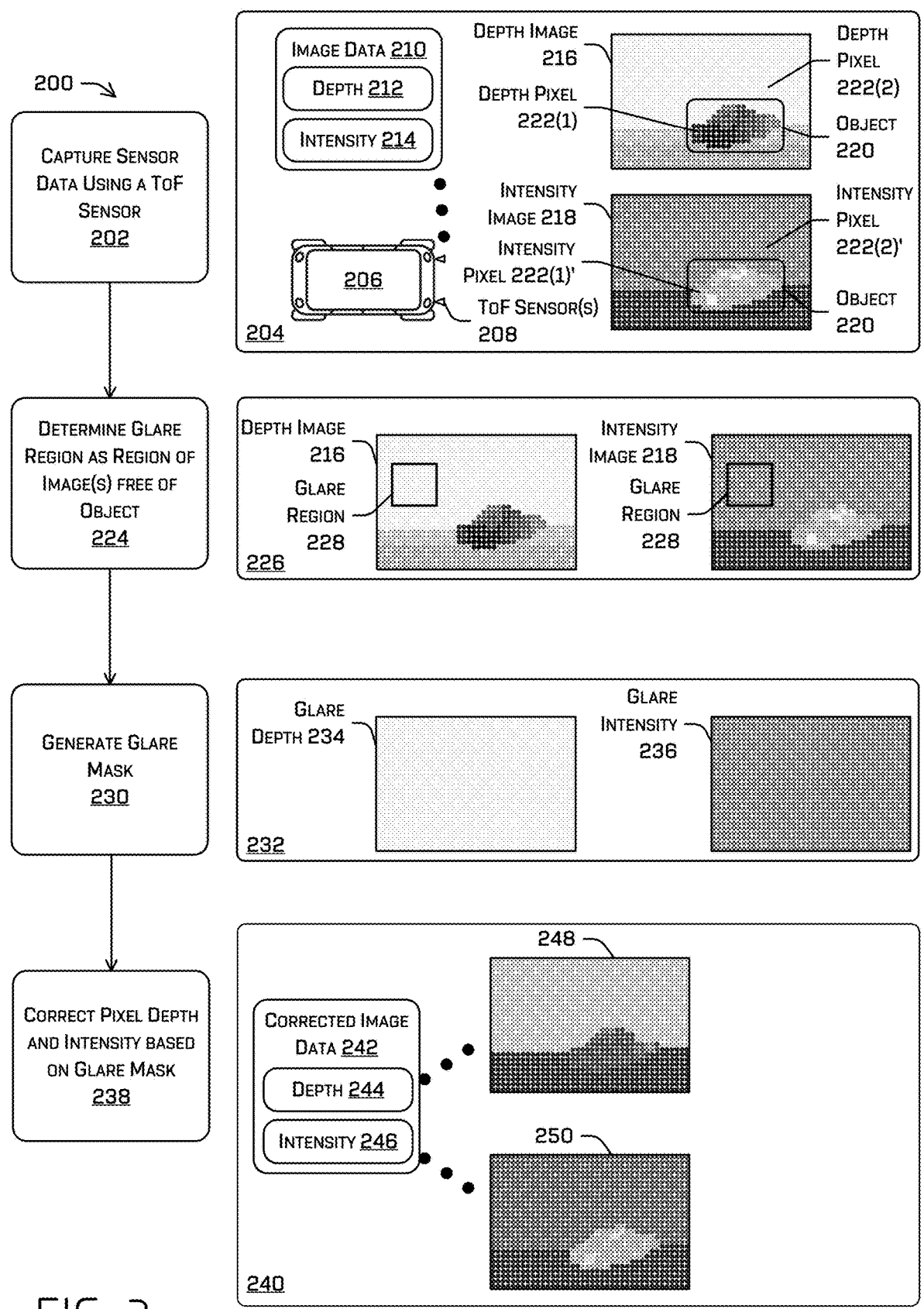
FIG. 2 includes textual and pictorial flowcharts of an example method for correcting for glare in images captured by a sensor, such as a time-of-flight sensor, as described herein.

FIG. 2 includes textual and graphical flowcharts illustrative of a process 200 for correcting for glare, according to implementations of this disclosure. For example, the process 200 can be implemented using components and systems illustrated in FIG. 1 and described above, although the process 200 is not limited to being performed by such components and systems. Moreover, the components and systems of FIG. 1 are not limited to performing the process 200.

In more detail, the process 200 can include an operation 202 that includes capturing sensor data using a time-of-flight sensor. As noted above, techniques described herein may be particularly applicable to use with time-of-flight sensors, and the example of FIG. 2 uses time-of-flight sensors as one specific example. The disclosure is not limited to use with time-of-flight sensors, as techniques described herein may be applicable to other types of sensors that may be adversely affected by glare. In some examples, the operation 202 can include receiving both depth and intensity data measured by the time-of-flight sensor.

An example 204 accompanying the operation 202 illustrates a vehicle 206, which may be the vehicle 102 in some examples. One or more time-of-flight sensors 208 are mounted on the vehicle 206, e.g., to sense an environment surrounding the vehicle 102. For instance, the time-of-flight sensor(s) 208 may be arranged to sense objects generally in a direction of travel of the vehicle 206, although the sensors may be otherwise disposed and more or fewer sensors than the two illustrated may be present. The time-of-flight sensor(s) 208 may be configured to generate image data 210, which can include depth information 212 and intensity information 214. In at least some examples, the depth information 212 can include or be embodied as a depth image 216 and the intensity information 214 can include or be embodied as an intensity image 218. As illustrated in the example 204, the depth image 216 can represent a depth of sensed objects in a scene on a pixel-by-pixel basis and the intensity image 218 can represent an intensity (e.g., brightness) of sensed objects in the scene on the same pixel-by-pixel basis. In the example, the depth image 216 and the intensity image 218 may include information about an object 220, which, for example, may be a vehicle travelling on a road proximate the vehicle 206. The depth image 216 and the intensity image 218 may be generated at substantially simultaneously the same time. In the representation of the depth image 216, relatively lighter pixels may represent objects that are farther away (e.g., background objects) whereas as relatively darker pixels may represent relatively closer objects. The example 204 specifically identifies a first depth pixel 222(1) in the depth image 216 associated with the object 220 and a second depth pixel 222(2) associated with a background of the sensed environment. The example 204 also outlines the object 220 in the intensity image 218. In the intensity image 218, relatively lighter pixels may represent higher intensity whereas relatively darker pixels may represent lower intensity. The example 204 specifically identifies a first intensity pixel 222(1)' and a second intensity pixel 222(2)' in the intensity image 218. The first depth pixel 222(1) and the first intensity pixel 222(1)' generally correspond to the same portion of the object 220, e.g., they are associated and include intensity and depth information, respectively, for the same portion of the same surface in the environment. Similarly, the second depth pixel 222(2) and the second intensity pixel 222(2) generally correspond to the same portion of the background of the environment, e.g., they are associated and include intensity and depth information, respectively, for the same portion of the same surface or feature in the background. Stated differently, the depth associated with the first depth pixel 222(1) and the intensity associated with the first intensity pixel 222(1)' may describe attributes (depth and intensity) of the same pixel. Although described as two distinct images, it is contemplated that in some examples such values may stored in a single image wherein each pixel of the image has an intensity value and corresponding depth value.

At an operation 224, the process 200 can also include determining a glare region as a region in the image data free of an object and/or a region in which the sensor does not detect an object. As described further herein, in some instances, glare may generally affect all pixels in regions of the image data 210 in a uniform manner. Accordingly, the operation 224 may identify those pixels for which the intensity and/or the depth are expected to be made up exclusively of intensity and/or depths attributable to the glare. Such regions may be regions free of objects, like the glare region 228 illustrated in an example 226 accompanying the operation 224. As shown in the example 226, the glare region 228 can be identified in either or both of the depth image 216 and/or the intensity image 218. In some examples, a value of the intensity of the glare (e.g., $I_{glare}$ described above) can be determined as the glare associated with any of the intensity pixels in the glare region and a value of the depth of the glare (e.g., $d_{glare}$ described above) can be determined as the depth associated with any of the depth pixels in the glare region. Additional details of finding the glare region are disclosed below, including in connection with an operation 404 in FIG. 4.

At operation 230, the process 200 can include generating a glare mask. For instance, the glare mask can be one or more images including values associated with the glare depth (e.g., $d_{glare}$) and/or the glare intensity (e.g., $I_{glare}$) as discussed above. In an example 232 accompanying the operation 230, a glare mask can include a glare depth image 234 and/or a glare intensity image 236, which associate the glare depth and glare intensity with pixels in the respective images. As noted above, glare can be uniform across the entirety of the image, so the glare depth image 234 may associate the same depth value with all pixels and the glare intensity image 236 may associate the same intensity with all pixels. In examples, the value(s) for the glare depth image 234 can correspond to, or be based at least in part on, a depth value for pixels in the glare region 228. Similarly, the value(s) for the glare intensity image 236 can correspond to, or be based at least in part on, an intensity value for pixels in the glare region 228.

In the illustrated example, the glare depth image 234 and the glare intensity image 236 are illustrated as uniform across all pixels. However, in other implementations, the attributes of the glare may not be uniform. For example, in some instances, multiple glare regions, such as the glare region 228 can be determined throughout the image data, e.g., in the depth image 216 and/or the intensity image 218, each having different glare intensities and/or depths. As noted above, glare can result from reflection off highly-reflective objects, such as retroreflectors or the like. When multiple such reflective surfaces are present in the range of the sensor, different pixels can be influenced differently. Thus, in at least some examples, the operation 224 can include determining multiple glare regions and the operation 230 can include generating glare masks based on those different glare regions.

In some instances, glare may be generated by the lens of the sensor (due to reflections, refractions, etc., of either emitted or ambient light), and parameters or characteristics of the lens may be used to further refine or define the glare mask. In some examples, the lens may be circularly symmetrical, and in examples, the glare mask may include values determined based at least in part on an expected or known glare distribution across the lens. For instance, a glare spread function of the sensor can be known (or derived) that correlates the effect of glare on pixels around and/or spaced from a glare source. For instance, the glare spread function may define the effect of glare on pixels based on a radial distance (e.g., measured in pixels in the depth image or intensity image) of those pixels from one or more pixels associated with a glare source. Thus, unlike in the example 226 in which the glare region is determined as pixels that may not be associated with objects sensed by the sensor (or with areas in which no objects are present), generating the glare mask based at least in part on the glare spread function can also require identification of a glare source. In some examples, such source can be identified as one or more saturated pixels in the intensity image, for example. Thus, in some implementations, the glare spread function can be used to alter or adjust, e.g., on a per-pixel basis, glare intensity and/or glare depth in a glare mask generated according to example 226 and other techniques described herein. By way of non-limiting example, depth pixels in the glare depth image 234 and/or intensity pixels in the glare intensity image 236 may be altered based on a determination of a point or points associated with a source of the glare, e.g., one or more points on the object 220. For instance, the glare from such source may have a greater effect on depth and/or intensity closer to the object and less of an effect farther from the object, as defined by the glare spread function. In at least some examples, the glare depth image 234 and/or the glare intensity image 236 may be based solely on the glare spread function.

At operation 238, the process 200 can include correcting pixel depth and intensity based on the glare mask. An example 240 accompanying the operation 238 illustrates corrected image data 242 as including both corrected depth information 244 and corrected intensity information 246. For example, the corrected depth information 244 may be embodied as a corrected depth image 248 and the corrected intensity information 246 may be embodied as a corrected intensity image 250. As illustrated, depth pixels in the corrected depth image 248 are different from (e.g., have different depth values than) the depth pixels 222' and intensity pixels in the corrected intensity image 250 are different from (e.g., have different intensity values than) the intensity pixels 222' in the intensity image 218. For example, the operation 238 can include solving Equation (3) to determine the corrected depth information (e.g., $d_{obj}$) for each pixel and using Equation (2) to determine the corrected intensity (e.g., $I_{obj}$) for each pixel. In some implementations, the corrected image data 242 may be transmitted to a control system associated with the vehicle 206, e.g., for detection of obstacles and/or to generate controls for navigating relative to objects.

Figure 3:
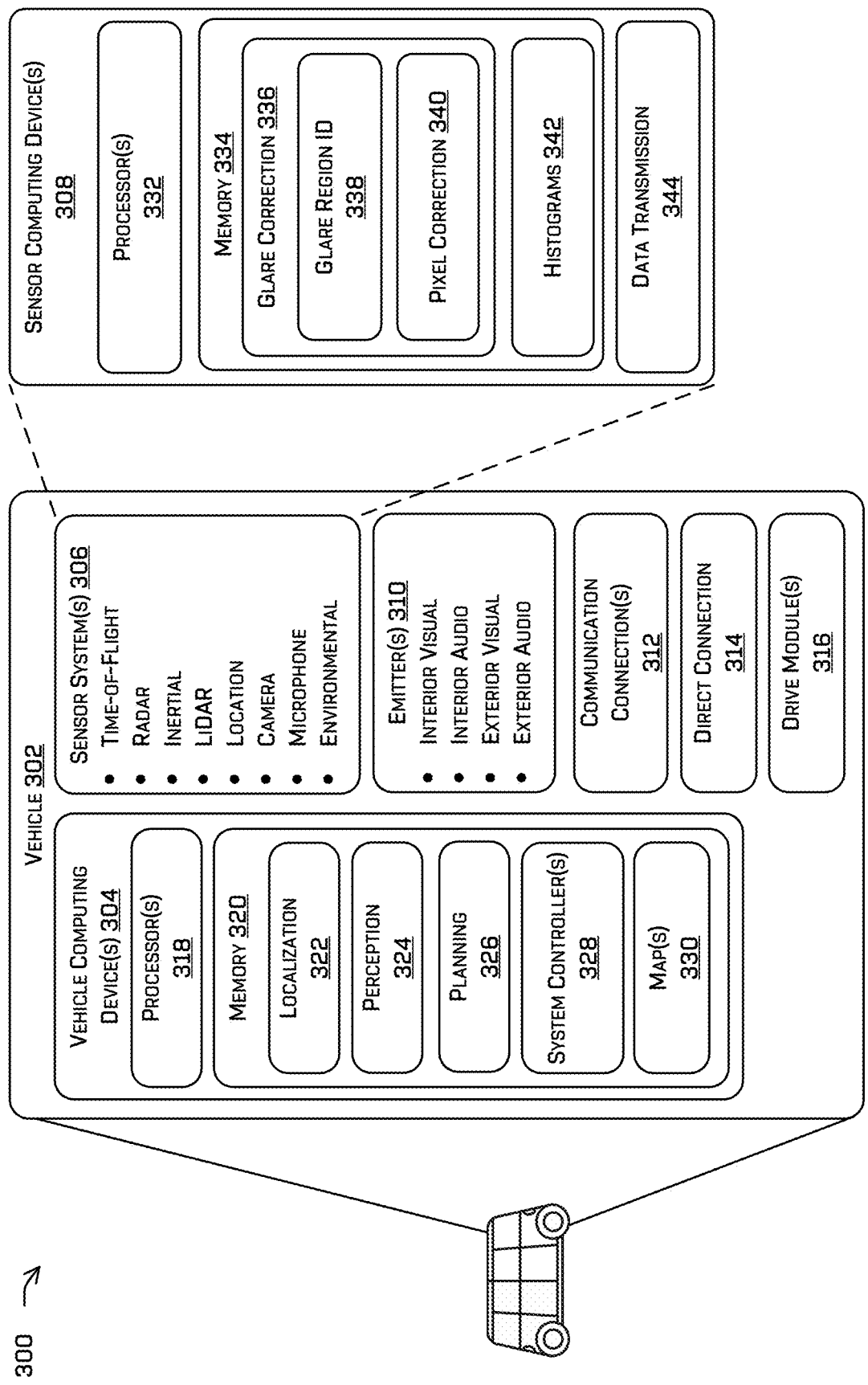
FIG. 3 depicts a block diagram of an example computing system for correcting sensor data to remove inaccuracies caused by glare, as described herein.

FIG. 3 depicts a block diagram of an example system 300 for implementing the techniques discussed herein. In at least one example, the system 300 can include a vehicle 302, which can be similar to (or the same as) the vehicle 102 described above with reference to FIG. 1. In the illustrated example 300, the vehicle 302 is an autonomous vehicle; however, the vehicle 302 can be any other type of vehicle.

The vehicle 302 can include one or more vehicle computing devices 304, one or more sensor systems 306, which may include one or more sensor computing devices 308, one or more emitter(s) 310, one or more communication connections 312, at least one direct connection 314 (e.g., for physically coupling with the vehicle 302 to exchange data and/or to provide power), and one or more drive modules 316. In some instances, the vehicle 302 can include more or fewer instances of the vehicle computing device(s) 304. The sensor system(s) 306 can be configured to capture sensor data associated with an environment. In examples, the sensor system(s) 306 can include the sensor system(s) 104 and/or the time-of-flight sensor(s) 208.

The vehicle computing device(s) 304 can include one or more processors 318 and memory 320 communicatively coupled with the one or more processors 318. In at least one instance, the processor(s) 318 can be similar to the processor(s) 106 and the memory 320 can be similar to the memory 108 described above with reference to FIG. 1. In the illustrated example, the memory 320 of the vehicle computing device(s) 304 stores a localization component 322, a perception component 324, a planning component 326, one or more system controllers 328, and one or more maps 330. Though depicted as residing in the memory 320 for illustrative purposes, it is contemplated that the localization component 322, the perception component 324, the planning component 326, and/or the system controller(s) 328 can additionally, or alternatively, be accessible to the vehicle computing device(s) 304 (e.g., stored in a different component of vehicle 302 and/or stored remotely).

In at least one example, the localization component 322 can include functionality to receive data from the sensor system(s) 306 to determine a position of the vehicle 302. In instances described herein, in which the sensor system(s) 306 include a time-of-flight sensor, the localization component 322 can receive corrected data, such as the corrected image data 242, corrected for glare. In examples, the corrected data can include depth and/or intensity information. In other implementations, the localization component 322 can include and/or request/receive a three-dimensional map, e.g., of the map(s) 330 of an environment and can continuously determine a location of the autonomous vehicle within the map. In some instances, the localization component 322 can use SLAM (simultaneous localization and mapping) or CLAMS (calibration, localization and mapping, simultaneously) to receive image data, such as from the time-of-flight sensor, LiIDAR data, RADAR data, SONAR data, IMU data, GPS data, wheel encoder data, or any combination thereof, and the like to accurately determine a location of the autonomous vehicle 302. In some instances, the localization component 322 can provide data to various components of the vehicle 302 to determine an initial position of an autonomous vehicle for generating a candidate trajectory, as discussed herein.

In some examples, the perception component 324 can include functionality to perform object detection, segmentation, and/or classification. In some examples, the perception component 324 can receive data including the corrected image data 242 and generate processed sensor data that indicates a presence of an object in the environment of, e.g., proximate, the vehicle 302 and/or a classification of the object as an object type (e.g., car, pedestrian, cyclist, building, tree, road surface, curb, sidewalk, unknown, etc.). In additional and/or alternative examples, the perception component 324 can provide processed sensor data that indicates one or more characteristics associated with a detected object and/or the environment in which the object is positioned. In some examples, characteristics associated with an object can include, but are not limited to, an x-position (global position), a y-position (global position), a z-position (global position), an orientation, an object type (e.g., a classification), a velocity of the object, an extent of the object (size), or the like. Characteristics associated with the environment can include, but are not limited to, a presence of another object in the environment, a state of another object in the environment, a time of day, a day of a week, a season, a weather condition, an indication of darkness/light, etc.

In some instances, the planning component 326 can determine a path for the vehicle 302 to follow to traverse through an environment. For example, the planning component 326 can determine various routes and trajectories and various levels of detail. In some examples, the planning component 326 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 326 can generate an instruction for guiding the autonomous vehicle along at least a portion of the route from the first location to the second location. In at least one example, the planning component 326 can determine how to guide the autonomous vehicle from a first waypoint in the sequence of waypoints to a second waypoint in the sequence of waypoints. In some examples, the instruction can be a trajectory, or a portion of a trajectory. In some instances, multiple trajectories can be substantially simultaneously generated (i.e., within technical tolerances) in accordance with a receding horizon technique. A single trajectory of the multiple trajectories in a receding horizon having the highest confidence level may be selected to operate the vehicle.

In other examples, the planning component 326 can alternatively, or additionally, use data from the perception component 324 to determine a path for the vehicle 302 to follow to traverse through an environment. For example, the planning component 326 can receive data from the perception component 324 regarding objects associated with an environment. Using this data, the planning component 326 can determine a route to travel from a first location (e.g., a current location) to a second location (e.g., a target location) to avoid objects in an environment.

As noted above, the vehicle computing device(s) 304 can include the system controller(s) 328, which can be configured to control steering, propulsion, braking, safety systems, emitters, communication systems, and/or other systems of the vehicle 302. The system controller(s) 328 can communicate with and/or control corresponding systems of the drive module(s) 316 and/or other components of the vehicle 302, which may be configured to operate in accordance with a trajectory provided from the planning component 326.

In some examples, the map(s) 330 can be stored on a remote computing device. In some examples, multiple maps 330 can be stored based on, for example, a characteristic (e.g., type of entity, time of day, day of week, season of the year, etc.). Storing multiple maps 330 can have similar memory requirements, but increase the speed at which data in a map can be accessed.

In at least one example, the sensor system(s) 306 can be similar to the sensor system(s) 104 described above with reference to FIG. 1. The sensor system(s) 306 can include time-of-flight sensors, such as the time-of-flight sensors 208, location sensors (e.g., GPS, compass, etc.), inertial sensors (e.g., inertial measurement units (IMUs), accelerometers, magnetometers, gyroscopes, etc.), LIDAR sensors, RADAR sensors, SONAR sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 306 can include multiple instances of each of these or other types of sensors. For instance, the time-of-flight sensors can include individual time-of-flight sensors located at the corners, front, back, sides, and/or top of the vehicle 302. As another example, the camera sensors can include multiple cameras disposed at various locations about the exterior and/or interior of the vehicle 302. The sensor system(s) 306 can provide input to the vehicle computing device(s) 304.

The sensor system(s) 306 can include the sensor computing device(s) 308, which can include one or more processors 332 and memory 334 communicatively coupled with the one or more processors 332. The one or more processors 332 can be similar to the processor(s) 106 and/or to the processor(s) 318, described above. The memory 334 can be similar to the memory 108 and/or to the memory 320, described above. In the illustrated example, the memory 334 of the sensor computing device(s) 308 can store a glare correction system 336, which can include a glare region identification component 338 and a pixel correction component 340, and one or more histograms 342. Though depicted as residing in the memory 334 for illustrative purposes, it is contemplated that the glare correction system 336 (as well as its associated components) and/or the histograms 342 can additionally, or alternatively, be accessible to the sensor system(s) 306 (e.g., stored in a different component of vehicle 302 and/or stored remotely). Moreover, although the glare correction system 336 (as well as its associated components) and the histograms 342 are illustrated as being stored in and/or part of the sensor computing device(s) 308, in other implementations any or all of these components may be stored in the memory 320 and/or in some other, not illustrated memory, such as a remote memory associated with a remote computing device. That is, although FIG. 3 illustrates several components as being part of the sensor computing device(s) 308 of the sensor system(s) 306, the processing associated with any or all of those components may be performed other than at the sensor. In one example, the sensor system(s) 306 may output raw data, e.g., the quadrature data discussed above, for processing in accordance with functionality ascribed herein to one or more of the glare correction system 336, the glare region identification component 338, and/or the pixel correction component 340, but that processing may be performed other than at the location of the emitter and the receiver. Moreover, the histograms 342 may be generated (and stored) other than by the sensor computing device(s) 308. Without limitation, the sensor system(s) 306 can include on-board processing capabilities to perform any or all functionality described herein and associated with correcting glare on the sensor. Alternatively, processing of the sensor data may be processed to correct for glare other than at the sensor system(s) 306.

The sensor computing device(s) 308, including the glare correction system 336, may be configured to generate and/or process data in many formats. For example, and as noted above, the sensor computing device(s) 308 can measure a phase shift between the carrier and the response carrier and/or perform numerical integration calculations to determine the sensor data in the quadrature format. In other examples, the sensor computing device(s) 308 can determine an intensity and depth format of the sensor data, e.g., generate the depth and intensity images. For purposes of illustration only, the sensor system(s) 306 can determine the sensor data in the intensity and depth format where an individual pixel in the sensor data is associated with an 8-bit value for the intensity and a 12-bit value for the depth.

The glare correction system 336 can be configured to receive sensor data generated by the sensor system(s) 306, e.g., by a time-of-flight sensor, and correct the sensor data to remove glare. In examples, correcting glare can include generating corrected sensor data that includes per-pixel values of intensity and/or depth free of errors caused by glare. For example, and as detailed herein, glare can cause measured returns at a time-of-flight sensor to be inaccurate. In examples, measured intensity at a pixel can be the sum of the intensity from the glare and an actual intensity associated with a sensed object. Glare can also alter cause the measured depths of objects to diverge from their actual depth relative to the sensor. This depth error can be particularly problematic in implementations in which a distance to objects in the environment is required, e.g., to safely travel through an environment relative to such objects.

The glare region identification component 338 can identify areas, e.g., subsets of pixels, that can be used to determine attributes, e.g., depth and intensity, associated with the glare. For example, the glare region identification component 338 can identify portions of image data, e.g., portions of images generated by a time-of-flight sensor, that are associated with background and not associated with objects in sensing proximity of the sensor system(s) 306. As described further herein, pixels that are known to correspond to the background may have an intensity that represents an intensity associated with the glare, for instance, because absent the glare, the pixel would have a much lower intensity. Similarly, the depth of such pixels may be a depth associated with the glare, because absent the glare, the pixel may not include a reliable depth.

The pixel correction component 340 can generate updated, e.g., corrected, data representative of true intensity and depth measurements by quantifying the impact of glare on measured intensity and depth values and correcting the measured values using the quantification. For instance, the pixel correction component 340 can determine depth attributable to glare and intensity attributable to glare using measured values associated with pixels in the glare region. In some instances, the pixel correction component 340 can generate a glare mask representative of the glare depth and intensity and process the measured sensor data to create updated depth and intensity images. As also discussed above, the pixel correction component 340 can access glare spread functions associated with the sensor to determine the influence of glare on a pixel-by-pixel basis to further determine an amount of correction. Also in examples, the pixel correction component 340 can send the corrected sensor data to other components, including but not limited to the localization component 322 and/or the perception component 324.

The sensor computing device(s) 308 may also include functionality to generate the histograms 342. For instance, the histograms 342 may include, for each instance of image data, distributions of the depths and/or intensity values in the image data. As detailed further herein, the histograms 342 may be used, e.g., by the glare region identification component 338, to identify glare regions.

The sensor computing device(s) 308 of the sensor system(s) 306 can also include a data transmission component 344. The data transmission component 344 can transmit the sensor data, e.g., corrected sensor data, from the sensor computing device(s) 308, e.g., to the localization component 322, the perception component 324, and/or the planning component 326.

The emitter(s) 310 are configured for emitting light and/or sound, as described above. In the illustrated example, the emitter(s) 310 can include interior visual and/or interior audio emitters to communicate with passengers of the vehicle 302. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 310 in this example also include exterior emitters, which may be exterior visual and/or exterior audio emitters. By way of example and not limitation, the exterior emitters in this example can include lights to signal a direction of travel or other indicator of vehicle action (e.g., indicator lights, signs, light arrays, etc.) and one or more audio emitters (e.g., speakers, speaker arrays, horns, etc.) to audibly communicate with pedestrians or other nearby vehicles, one or more of which may comprise acoustic beam steering technology.

The communication connection(s) 312 enable communication between the vehicle 302 and one or more other local or remote computing device(s), including the sensor computing device(s) 308. For instance, the communication connection(s) 312 can facilitate communication with other local computing device(s) on the vehicle 302 and/or the drive module(s) 316. Also, the communication connection(s) 312 can allow the vehicle to communicate with other nearby computing device(s) (e.g., other nearby vehicles, traffic signals, etc.). The communications connection(s) 312 can also enable the vehicle 302 to communicate with a remote teleoperations computing device or other remote services.

The communications connection(s) 312 can include physical and/or logical interfaces for connecting the vehicle computing device(s) 304 to another computing device or an external network (e.g., the Internet). For example, the communications connection(s) 312 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In some examples, the drive module(s) 316 can include a single drive module 316. In other examples, the vehicle 302 can have multiple drive modules, and individual drive modules 316 can be positioned on opposite ends of the vehicle 302 (e.g., the front and the rear, etc.). In at least one example, the drive module(s) 316 can include one or more sensor systems to detect conditions of the drive module(s) 316 and/or the surroundings of the vehicle 302. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LiDAR sensors, RADAR sensors, etc. Some sensors, such as the wheel encoders can be unique to the drive module(s) 316. In some cases, the sensor system(s) on the drive module(s) 316 can overlap or supplement corresponding systems of the vehicle 302 (e.g., the sensor system(s) 306).

The drive module(s) 316 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 316 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 316. Furthermore, the drive module(s) 316 also include one or more communication connection(s) that enable communication by the respective drive module with one or more other local or remote computing device(s).

The processor(s) 318 of the vehicle 302, the processor(s) 332 of the sensor computing device(s) 308, and/or the processor(s) 106 of the sensor system(s) 104 can be any suitable processor capable of executing instructions to process data and perform operations as described herein. By way of example and not limitation, the processor(s) 318, 332, 106 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 320, 334, 108 are examples of non-transitory computer-readable media. The memory 320, 334, 108 can store an operating system and one or more software applications, instructions, programs, and/or data to implement the methods described herein and the functions attributed to the various systems. In various implementations, the memory 320, 334, 108 can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 320, 334, 108 can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can use machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

Figure 4:
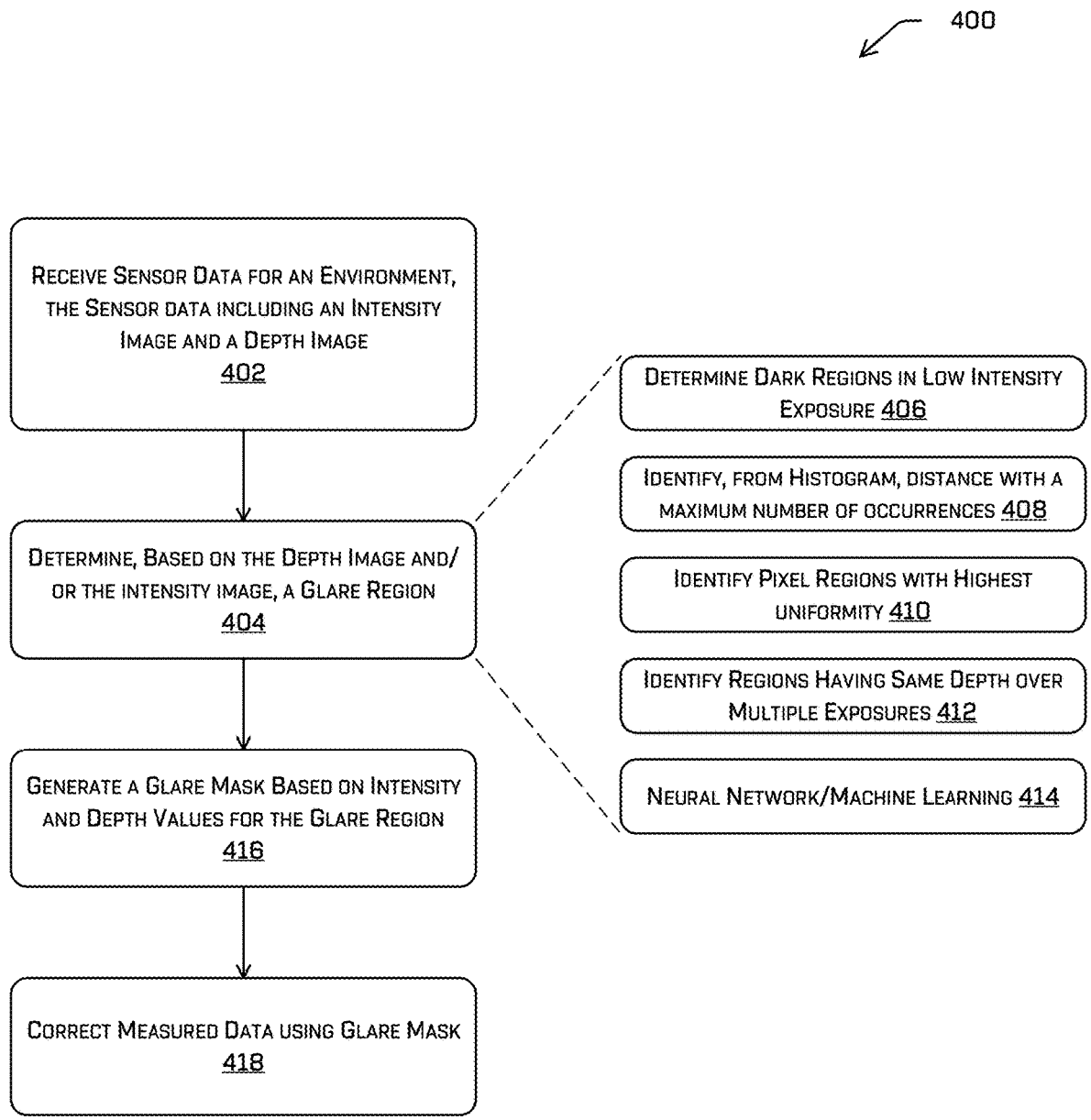
FIG. 4 is a flowchart illustrating an example method for correcting for glare in images captured by a sensor, such as a time-of-flight sensor, as described herein.
Figure 5:
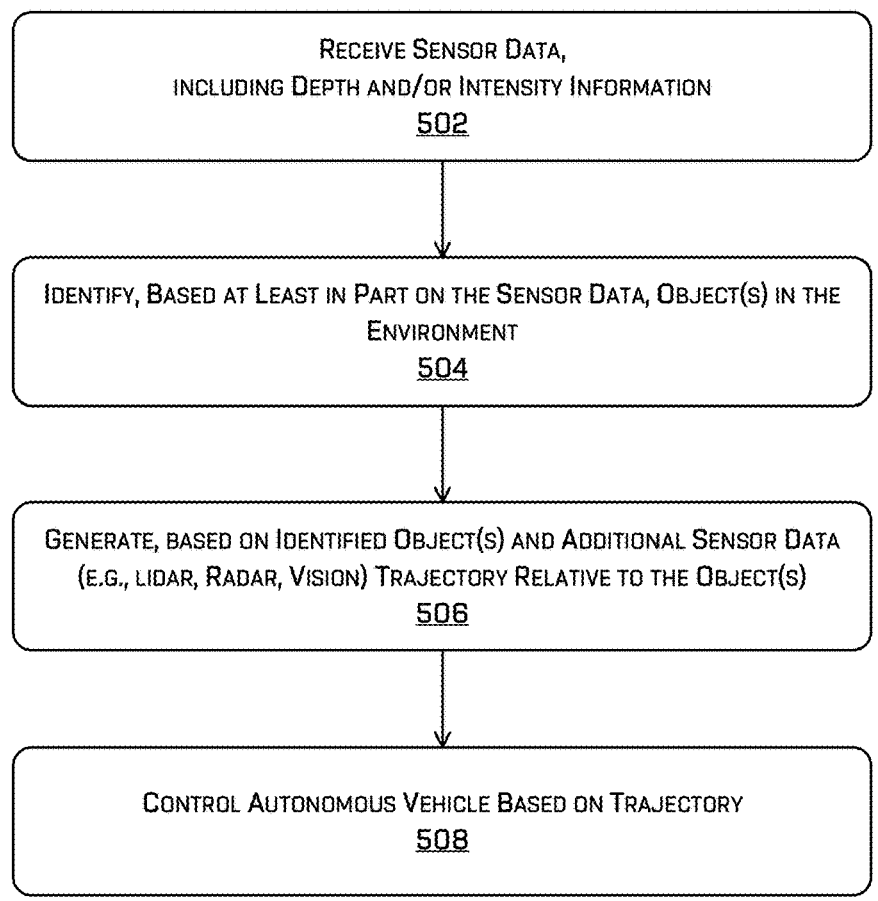
FIG. 5 is a flowchart illustrating an example method for controlling a vehicle relative to obstacles sensed by a sensor, such as a time-of-flight sensor, as described herein.

FIGS. 4 and 5 (and portions of FIG. 2, discussed above) illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

In more detail, FIG. 4 depicts an example process 400 for correcting measured data for errors caused by glare. For example, some or all of the process 400 can be performed by the sensor system(s) 104 and/or by one or more components illustrated in FIG. 3, as described herein. For example, some or all of the process 400 can be performed by the sensor computing device(s) 308 of the sensor system(s) 306, including, but not limited to, the glare region identification component 338 and/or the pixel correction component 340. However, the process 400 is not limited to being performed by these components, and the components are not limited to performing the process 400.

At operation 402, the process 400 includes receiving sensor data for an environment, the sensor data including an intensity image and a depth image. For example, techniques described herein may be useful for correcting for glare in sensor data received from a time-of-flight sensor. In these examples, the time-of-flight sensor generates a depth image describing depths for individual measured pixels and an intensity image describing intensities for the individual measured pixels.

At operation 404, the process 400 can include determining, based on the depth image and/or the intensity image, a glare region. In some examples, the glare region may include one or more pixels that do not correspond to an object. Instead, the glare region may be associated with a background and/or far-away object(s). As detailed above, glare may result from reflection of measured light off a highly reflective surface (or a close surface), and may create ghosting and/or haze across the image. In examples, a depth associated with glare may be relatively uniform across an image and/or portions of the image. Accordingly, depth pixels that are not associated with an object, e.g., that do not have a reliable depth, may have a measured depth corresponding to the depth of the glare. More specifically, consider Equation (1), provided above. When a pixel does not correspond with a sensed object (e.g., a sensed object is outside the range of the sensor or the pixel is otherwise associated with a background), the intensity of the object is zero, which causes Equation (1) to be rewritten, for pixels not associated with objects, as Equation (4):

$$d_{measured} = \frac{I_{glare} \times d_{glare}}{I_{glare}} \quad (4)$$

As will also be appreciated, $I_{glare}$ in the numerator and denominator cancel each other out, leaving $d_{measured} = d_{glare}$. Accordingly, the depth measurements of depth pixels not associated with objects correspond to (e.g., are equal to) the depth of the glare. Accordingly, determining the glare region can, in some instances, include identifying those areas or regions of the image data that do not include objects and/or areas or regions in which no objects are detected by the sensor. Example techniques that use these concepts may include one or more of operations 406, 408, 410, 412, 414, detailed further herein.

The operation 406 is a first example technique for determining the glare region. More specifically, the operation 406 can include determining dark regions in a low intensity exposure. In examples, a time-of-flight sensor, such as the sensor systems(s) 104, can generate frames or images at varied illumination intensities and/or exposures. For instance, the intensity image 114 can include first image information generated at a relatively higher intensity and/or over a longer integration time, e.g., to capture information about relatively farther away and/or darker objects, and second image information generated at a relatively lower intensity and/or for a shorter integration time, e.g., to capture relatively closer and/or brighter objects. In examples, the images at the varied intensities and/or the varied integration times can be aggregated to form the intensity image 114, similar to HDR. In the operation 406, however, intensity information from the image(s) capture at the relatively lower intensity and/or the relatively shorter integration time may be used to determine the glare region. For instance, and as noted above, the glare region may be a region in the image, e.g., a subset of pixels, that correspond to regions other than objects. Thus, for example, the glare region may be associated with a background (e.g., including objects beyond the range of the sensor). In the depth information captured using the relatively lower intensity and/or the relatively shorter integration time, such pixels will be "dark" pixels, e.g., pixels having an intensity close to zero and/or otherwise equal to or below some relatively low threshold intensity. Accordingly, the dark pixels may be identified as glare regions. Such pixels may have reduced impact from glare, e.g., as the glare may generally result from data captured at a higher intensity and/or over a longer integration time. Although described in connection with a low intensity or low power exposure from among a plurality of exposures (e.g., used to perform HDR), implementations of the operation 406 can be based on a single image.

The operation 408 is a second example technique for determining the glare region. More specifically, the operation 408 can include identifying, from a histogram or otherwise, a distance with a maximum number of occurrences. In some instances, an object or objects can occupy only a small portion of a field of view of a sensor. In contrast, background objects, including objects outside the range of the sensor, may take up significantly more of the field of view. In addition to being more prevalent, depths associated with the background may also be substantially uniform. For instance, because the background objects are outside the range of the sensor, the measured depth may be ambiguous or have a very low confidence. However, when glare is present, the measured depth of the background pixels can become the depth of the glare, as described herein. Thus, a histogram generated based on the image data may show a significant number of pixels having the similar or the same measured depths. Such pixels may be identified as glare regions (and depths associated with these pixels can be the glare depth).

The operation 410 is a third example technique for determining the glare region. The operation 410 can include identifying pixel regions with the highest uniformity in the depth image. Similar to the operation 408, the operation 410 assumes that the impact of glare is relatively uniform across the depth image. The operation 410 can include sampling regions, e.g., groups of neighboring pixels, to determine a variance, and determining the glare depth as pixels associated with areas having a variance below a threshold variance.

The operation 412 is a fourth example technique for determining the glare region. More specifically, the operation 412 can include identifying regions having the same (or substantially the same) depth over multiple exposures. As noted above in connection with the operation 406, the sensor may capture images or exposures at different illumination intensities, e.g., to generate depth and intensity images at a relatively higher intensity and corresponding depth and intensity images at a relatively lower intensity. The operation 412 can include comparing pixels from the two depth images associated with the different exposures (e.g. a first depth image associated with a higher illumination intensity and/or longer integration time and a second depth image associated with a lower illumination intensity and/or shorter integration time). The comparison can identify those pixels for which the depth is the same across both exposures. Pixels associated with objects will see a depth variation based on the glare (as detailed by Equation (1)), whereas those not associated with objects will have the same depth, e.g., the measured depth. The pixels having the same depths can be identified as the glare regions.

The operation 414 is a fifth example technique for determining the glare region. More specifically, the operation 414 can include applying a neural network or other machine learning technique to determine the glare region. For example, the neural network and/or the machine learning technique(s) can be trained on image data, e.g., depth and/or intensity images, to identify areas that are free of objects. In implementations, a trained model may be implemented on the sensor system(s) and/or remote from the sensor and/or the vehicle.

At operation 416, the process 400 can include generating a glare mask including intensity and depth values based on the glare region. For example, the operation 404 can include identifying those pixels having measurements attributable (solely) to glare. Thus, once the regions are identified at the operation 404, e.g., using one of the techniques of operations 406, 408, 410, 412, and/or 414, depth and intensity values for pixels in those regions may be determined from the respective depth and intensity images. In examples, a glare mask may be an image having per-pixel intensity and/or depth values corresponding to the glare. For instance, the glare mask may have a uniform depth value for all pixels (e.g., $d_{glare}$) and a uniform intensity value for all pixels (e.g., $I_{glare}$), determined according to techniques described herein.

Also in examples, the operation 416 can include determining the glare mask using point source transmission characteristics, as detailed herein. For example, the operation 416 may identify the location(s) of bright pixels (e.g., above a threshold intensity and/or saturated), and use characteristics embodied in stray light performance curves and/or glare distribution functions associated with the lens to quantify glare at pixels based on a distance of those pixels from the source of the glare. For example, and as detailed further herein, the impact of glare may vary based on a radial distance of a pixel from one or more pixels associated with the source of the glare.

At operation 418, the process 400 can include correcting the measured data using the glare mask. For example, a corrected depth for each pixel can be determined using the Equation (3) and a corrected intensity for each pixel can be determined using the Equation (2). In this example, the corrected depth is $d_{obj}$, or the actual or true depth to the object and the corrected intensity is $I_{obj}$, or the actual or true intensity of the object, e.g., which depth and intensity would have been measured in the absence of glare.

FIG. 5 depicts an example process 500 for controlling an autonomous vehicle relative to objects in an environment, as discussed herein. For example, some or all of the process 500 can be performed by the vehicle 102 of FIG. 1 and/or the vehicle 302 and its related components illustrated in and discussed with reference to, FIG. 3. For example, some or all of the process 500 can be performed by the localization component 322, the perception component 324, the planning component 326, and/or the one or more system controllers 328.

At operation 502, the process can include receiving sensor data, including depth and/or intensity information. In examples described herein, the sensor data may be corrected data determined in accordance with the process 400. The sensor data may include a depth image and an intensity image containing the per-pixel corrected values. In at least some implementations, the sensor data can include information about substantially all pixels or, in other implementations, the sensor data can include information about only one or more subsets of pixels. By way of non-limiting example, the sensor data may include only those pixels associated with an object. In such examples, pixels associated with the glare region may be not received at the operation 502, because they may not correspond to an object, as discussed herein. The sensor data may be received from the time-of-flight sensor on a frame-by-frame basis, e.g., the sensor system may output data comprising a first frame (which includes both the depth image and the intensity image), a second frame, etc. in other examples, the sensor data may be a resolved frame (or data associated therewith), determined according to techniques disclosed in U.S. application Ser. No. 16/198,208, filed Nov. 21, 2018, and titled "Intensity and Depth Measurements in Time-of-Flight Sensors," the entire disclosure of which application is hereby incorporated by reference. As detailed therein, a resolved frame may include blended intensity determined using multiple frames of data at different integration times and/or different illumination intensities and/or disambiguated depths determined using multiple frames of data determined at different modulation frequencies. In still further embodiments the sensor data may be a representation of the environment, e.g., an image of the environment, generated using data from the time-of-flight sensor and/or data generated based on the data from the time-of-flight sensor.

At operation 504, the process 500 can include identifying, based at least in part on the sensor data, one or more objects in the environment. For example, the localization component 322 and/or the perception component 324 may receive the depth and/or intensity data at 502 and identify objects in the environment. For example, the vehicle computing device(s) 304 may classify objects based on the sensor data and map the objects in the environment relative to the vehicle 302, e.g., using one or more maps like the map(s) 330. For instance, the depth and/or intensity information may be used, either alone or in combination with other data, to determine one or more bounding boxes, such as three-dimensional bounding boxes, representative of the sensed objects.

At operation 506, the process 500 can include generating, based on the identified object(s) and additional sensor data (e.g., LiDAR data, radar data, vision data), a trajectory relative to the object(s). For example, the planning component 326 of the vehicle computing device(s) 304 can further determine relative movement, e.g., velocity and acceleration, of the objects in the environment using one or more sensor modalities, object classification data, and the maps 330 and/or other information to determine the trajectory. For example, the trajectory may define at least a portion of a travel path for the vehicle. In some examples, the trajectory and/or travel path may be based at least in part on fused data including data from one or more sensor modalities, including a time-of-flight sensor, LiDAR, radar, or the like.

At operation 508, the process 500 can include controlling an autonomous vehicle to follow the trajectory. In some instances, the operation 508 can include generating commands that can be relayed to a controller onboard an autonomous vehicle to control the autonomous vehicle to drive the travel path. Although discussed in the context of an autonomous vehicle, the process 500, and the techniques and systems described herein, can be applied to a variety of systems utilizing sensors.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks, or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

Example Clauses

A: An example system includes: a time-of-flight sensor configured to generate data based on light received at a receiver of the time-of-flight sensor; one or more processors; and memory storing processor-executable instructions that, when executed by the one or more processors, configure the system to: receive sensor data from the time-of-flight sensor, the sensor data comprising an intensity image including intensity pixels having measured intensities and a depth image including depth pixels having measured depths, an intensity pixel of the intensity pixels corresponding to a depth pixel of the depth pixels; determine, based at least in part on at least one of the intensity image or the depth image, a glare region, the glare region comprising a subset of the intensity pixels and a subset of the depth pixels; determine, based at least in part on a measured intensity value associated with a first intensity pixel in the glare region, a glare intensity; determine, based at least in part on a measured depth value associated with a first depth pixel in the glare region, a glare depth; and generate corrected data comprising a corrected depth image associating the depth pixels with corrected depth values, the corrected depth values being determined based at least in part on the measured intensity values, the glare intensity, the measured depth values, and the glare depth.

B: The system of example A, wherein a corrected depth value for a second depth pixel comprises the difference between (1) a product of a measured depth of the second depth pixel and a measured intensity of a second intensity pixel corresponding to the second depth pixel and (2) a product of the glare intensity and the glare depth, divided by the difference between the measured intensity of the second intensity pixel and the glare intensity.

C: The system of example A or example B, wherein the corrected data further comprises a corrected intensity image associating the intensity pixels with corrected intensity values, a corrected intensity value for a second intensity pixel comprising the different between a measured intensity of the second intensity pixel and the glare intensity.

D: The system of any one of example A through example C, wherein the glare region is determined based at least in part on identifying, from the depth image, the plurality of depth pixels as depth pixels having at least one of a substantially uniform depth value or as depth pixels having a depth value occurring in the depth image more than a threshold number of occurrences.

E: The system of any one of example A through example D, wherein: the intensity image comprises first information associated with a first exposure captured at a first illumination intensity of the time-of-flight sensor and second information associated with a second exposure captured at a second illumination intensity of the time-of-flight sensor, the second illumination intensity being higher than the first illumination intensity, and the glare region is determined based at least in part on identifying, from the first information, the plurality of intensity pixels as intensity pixels having an intensity below a threshold intensity.

F: The system of any one of example A through example E, wherein the instructions, when executed by the one or more processors, further configure the system to: determine, based at least in part on the corrected data, a position of an object in an environment of the time-of-flight sensor; determine a trajectory through the environment relative to the object; and control a vehicle to travel along the trajectory.

G: An example method includes: receiving sensor data from a time-of-flight sensor, the sensor data comprising an intensity image comprising a plurality of intensity pixels and a depth image comprising a plurality of depth pixels; determining, based at least in part on at least one of the intensity image or the depth image, a glare region; determining, based at least in part on intensity information associated with at least one intensity pixel in the glare region and depth information associated with at least one depth pixel in the glare region, a glare mask, the glare mask comprising information about a glare intensity and a glare depth; and generating, based at least in part on the measured data and the glare mask, corrected sensor data comprising corrected depth information.

H: The method of example G, wherein the corrected depth image comprises, for a first depth pixel located other than in the glare region, a corrected depth comprising the difference between (1) a product of a measured depth of the second depth pixel and a measured intensity of a second intensity pixel corresponding to the second depth pixel and (2) a product of the glare intensity and the glare depth, divided by the difference between the measured intensity of the second intensity pixel and the glare intensity.

I: The method of example G or example H, wherein the generating the corrected sensor data further comprises corrected intensity information, the corrected intensity information including a corrected intensity value for a first intensity pixel corresponding to the first depth pixel, the first corrected intensity value being based at least in part on a difference between a measured intensity value associated with the first intensity pixel and the glare intensity.

J: The method of any one of example G through example I, wherein: the measured data comprises first data captured at a first illumination intensity and second data captured at a second illumination intensity higher than the first illumination intensity, the method further comprising: identifying the plurality of intensity pixels as one or more first intensity pixels in the first data having an intensity equal to or below a threshold intensity, wherein the glare intensity comprises a measured intensity associated with the one or more first intensity pixels in the second data.

K: The method of any one of example G through example J, wherein the method further comprises at least one of: determining the glare depth as a measured depth associated with a first depth pixel in the glare region; or determining the glare intensity as a measured intensity associated a first intensity pixel in the glare region.

L: The method of any one of example G through example K, further comprising: determining a histogram associated with the depth information; determining, based at least in part on the histogram, a depth value associated with at least a threshold number of pixels; and determining the glare region as the subset of depth pixels of the depth information having the depth value and the corresponding subset of image pixels of the intensity information associated with the subset of depth pixels.

M: The method of any one of example G through example L, wherein: the glare region comprises a region of the depth image having at least one of a threshold depth uniformity or a threshold depth distribution.

N: The method of any one of example G through example M, wherein the measured data comprises first depth information associated with a first exposure and second depth information associated with a second exposure, the method further comprising: determining the glare region as one or more depth pixels having substantially the same depth value in the first depth information and in the second depth information.

O: The method of any one of example G through example N, wherein the glare mask is further based at least in part on a glare distribution function associated with the time-of-flight sensor.

P: An example system includes: one or more processors; and computer-readable storage media storing instructions executable by the one or more processors to perform operations comprising: receiving sensor data from a time-of-flight sensor, the sensor data comprising an intensity image comprising a plurality of intensity pixels and a depth image comprising a plurality of depth pixels; determining, based at least in part on at least one of the intensity image or the depth image, a glare region; determining, based at least in part on intensity information associated with at least one intensity pixel in the glare region, a glare intensity; determining, based at least in part on depth information associated with at least one depth pixel in the glare region, a glare depth; and generating, based at least in part on the measured data and the glare mask, corrected sensor data comprising corrected depth information.

Q: The system of example P, wherein the corrected depth information comprises a corrected depth image including, for a first depth pixel located other than in the glare region, a corrected depth comprising a first difference between (1) a product of a measured depth of the first depth pixel and a measured intensity of a first intensity pixel corresponding to the first depth pixel and (2) a product of the glare intensity and the glare depth, the first difference being divided by a second difference between the measured intensity of the first intensity pixel and the glare intensity.

R: The system of example P or example Q, wherein the generating the corrected sensor data further comprises corrected intensity information, the corrected intensity information including a corrected intensity value for a first intensity pixel corresponding to the first depth pixel, the first corrected intensity value being based at least in part on a difference between a measured intensity value associated with the first intensity pixel and the glare intensity.

S: The system of any one of example P through example R, wherein: the measured data comprises first data captured at a first illumination intensity and second data captured at a second illumination intensity higher than the first illumination intensity, the operations further comprising: identifying the plurality of intensity pixels as one or more first intensity pixels in the first data having an intensity equal to or below a threshold intensity, wherein the glare intensity comprises a measured intensity associated with the one or more first intensity pixels in the second data.

T: The system of any one of example P through example S, the operations further comprising: determining a histogram associated with the depth information; determining, based at least in part on the histogram, a depth value associated with at least a threshold number of depth pixels; and determining the glare region as the subset of depth pixels of the depth information having the depth value and the corresponding subset of image pixels of the intensity information associated with the subset of depth pixels.

Conclusion

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. A system comprising:
   a time-of-flight sensor configured to generate data based on light received at a receiver of the time-of-flight sensor;
   one or more processors; and
   memory storing processor-executable instructions that, when executed by the one or more processors, configure the system to:
      receive sensor data from the time-of-flight sensor, the sensor data comprising an intensity image including intensity pixels having measured intensities of one or more surfaces sensed by the time-of-flight sensor and a depth image including depth pixels having measured depths of the one or more surfaces;
      determine, based at least in part on at least one of the intensity image or the depth image, a glare region, the glare region comprising a subset of the intensity pixels and a subset of the depth pixels;
      determine, based at least in part on a measured intensity value associated with a first intensity pixel in the glare region, a glare intensity;
      determine, based at least in part on a measured depth value associated with a first depth pixel in the glare region, a glare depth;
      generate corrected data comprising a corrected depth image associating the depth pixels with corrected depth values of the one or more surfaces, the corrected depth values being determined based at least in part on the measured intensity values, the glare intensity, the measured depth values, and the glare depth; and
      determine, based at least in part on the corrected data, information about an object in an environment of the time-of-flight sensor.

2. The system of claim 1, wherein a corrected depth value for a second depth pixel of the depth pixels comprises the difference between (1) a product of a measured depth of the second depth pixel and a measured intensity of a second intensity pixel corresponding to the second depth pixel and (2) a product of the glare intensity and the glare depth, divided by the difference between the measured intensity of the second intensity pixel and the glare intensity.

3. The system of claim 1, wherein the corrected data further comprises a corrected intensity image associating the intensity pixels with corrected intensity values, a corrected intensity value for a second intensity pixel of the intensity pixels comprising the difference between a measured intensity of the second intensity pixel and the glare intensity.

4. The system of claim 1, wherein the glare region is determined based at least in part on identifying, from the depth image, the plurality of depth pixels as depth pixels having at least one of a substantially uniform depth value or as depth pixels having a depth value occurring in the depth image more than a threshold number of occurrences.

5. The system of claim 1, wherein:
the intensity image comprises first information associated with a first exposure captured at a first illumination intensity of the time-of-flight sensor and second information associated with a second exposure captured at a second illumination intensity of the time-of-flight sensor, the second illumination intensity being higher than the first illumination intensity, and
the glare region is determined based at least in part on identifying, from the first information, the plurality of intensity pixels as intensity pixels having an intensity below a threshold intensity.

6. The system of claim 1, wherein the instructions, when executed by the one or more processors, further configure the system to:
determine a trajectory through the environment relative to the object; and
control a vehicle to travel along the trajectory.

7. A method comprising:
receiving sensor data from a time-of-flight sensor, the sensor data comprising an intensity image comprising a plurality of intensity pixels having measured intensities of one or more surfaces sensed by the time-of-flight sensor and a depth image comprising a plurality of depth pixels having measured depths of the one or more surfaces;
determining, based at least in part on at least one of the intensity image or the depth image, a glare region;
determining, based at least in part on intensity information associated with at least one intensity pixel in the glare region and depth information associated with at least one depth pixel in the glare region, a glare mask, the glare mask comprising information about a glare intensity and a glare depth; and
generating, based at least in part on the measured data and the glare mask, corrected sensor data comprising corrected depths for the one or more surfaces.

8. The method of claim 7, wherein the corrected depths comprise, for a first depth pixel located other than in the glare region, a corrected depth that is the difference between (1) a product of a measured depth of the second depth pixel and a measured intensity of a second intensity pixel corresponding to the second depth pixel and (2) a product of the glare intensity and the glare depth, divided by the difference between the measured intensity of the second intensity pixel and the glare intensity.

9. The method of claim 8, wherein the corrected sensor data further comprises corrected intensity information, the corrected intensity information including a corrected intensity value for a first intensity pixel of the plurality of intensity pixels corresponding to the first depth pixel, the first corrected intensity value being based at least in part on a difference between a measured intensity value associated with the first intensity pixel and the glare intensity.

10. The method of claim 7, wherein:
the measured data comprises first data captured at a first illumination intensity and second data captured at a second illumination intensity higher than the first illumination intensity,
the method further comprising:
identifying the plurality of intensity pixels as one or more first intensity pixels in the first data having an intensity equal to or below a threshold intensity,
wherein the glare intensity comprises a measured intensity associated with the one or more first intensity pixels in the second data.

11. The method of claim 7, wherein the method further comprises at least one of:
determining the glare depth as a measured depth associated with a first depth pixel in the glare region; or
determining the glare intensity as a measured intensity associated a first intensity pixel in the glare region.

12. The method of claim 7, further comprising:
determining a histogram associated with the depth information;
determining, based at least in part on the histogram, a depth value associated with at least a threshold number of pixels; and
determining the glare region as a subset of depth pixels of the depth information having the depth value and the corresponding subset of image pixels of the intensity information associated with the subset of depth pixels.

13. The method of claim 7, wherein:
the glare region comprises a region of the depth image having at least one of a threshold depth uniformity or a threshold depth distribution.

14. The method of claim 7, wherein the measured data comprises first depth information associated with a first exposure and second depth information associated with a second exposure, the method further comprising:
determining the glare region as one or more depth pixels having substantially the same depth value in the first depth information and in the second depth information.

15. The method of claim 7, wherein the glare mask is further based at least in part on a glare distribution function associated with the time-of-flight sensor.

16. A system comprising:
one or more processors; and
non-transitory computer-readable storage media storing instructions executable by the one or more processors to perform operations comprising:
receiving sensor data from a time-of-flight sensor, the sensor data comprising an intensity image comprising a plurality of intensity pixels having measured intensities of one or more surfaces sensed by the time-of-flight sensor and a depth image comprising a plurality of depth pixels having measured depths of the one or more surfaces;
determining, based at least in part on at least one of the intensity image or the depth image, a glare region;
determining, based at least in part on intensity information associated with at least one intensity pixel in the glare region, a glare intensity;
determining, based at least in part on depth information associated with at least one depth pixel in the glare region, a glare depth; and
generating, based at least in part on the measured data and a glare mask, corrected sensor data comprising corrected depth information for the one or more surfaces.

17. The system of claim 16, wherein the corrected depth information comprises a corrected depth image including, for a first depth pixel of the plurality of depth pixels located other than in the glare region, a corrected depth comprising a first difference between (1) a product of a measured depth of the first depth pixel and a measured intensity of a first intensity pixel corresponding to the first depth pixel and (2) a product of the glare intensity and the glare depth, the first difference being divided by a second difference between the measured intensity of the first intensity pixel and the glare intensity.

18. The system of claim 17, wherein the generating the corrected sensor data further comprises corrected intensity information, the corrected intensity information including a corrected intensity value for a first intensity pixel of the plurality of intensity pixels corresponding to the first depth pixel, the first corrected intensity value being based at least in part on a difference between a measured intensity value associated with the first intensity pixel and the glare intensity.

19. The system of claim 16, wherein:
the measured data comprises first data captured at a first illumination intensity and second data captured at a second illumination intensity higher than the first illumination intensity,
the operations further comprising:
identifying the plurality of intensity pixels as one or more first intensity pixels in the first data having an intensity equal to or below a threshold intensity,
wherein the glare intensity comprises a measured intensity associated with the one or more first intensity pixels in the second data.

20. The system of claim 16, the operations further comprising:
determining a histogram associated with the depth information;
determining, based at least in part on the histogram, a depth value associated with at least a threshold number of depth pixels; and
determining the glare region as a subset of depth pixels of the depth information having the depth value and the corresponding subset of image pixels of the intensity information associated with the subset of depth pixels.

* * * * *